(12) United States Patent
Smagghe et al.

(10) Patent No.: US 12,515,441 B2
(45) Date of Patent: Jan. 6, 2026

(54) HEATABLE GLAZING PANEL

(71) Applicant: AGC GLASS EUROPE, Louvain-la-neuve (BE)

(72) Inventors: Mathieu Smagghe, Louvain-la-Neuve (BE); Charley Razzini, Louvain-la-Neuve (BE); Salah Eddine Ghozali, Louvain-la-Neuve (BE); Pierre Defoy, Louvain-la-Neuve (BE); Romain Dacquin, Basecles (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 856 days.

(21) Appl. No.: 17/283,899

(22) PCT Filed: Oct. 3, 2019

(86) PCT No.: PCT/EP2019/076822
§ 371 (c)(1),
(2) Date: Apr. 8, 2021

(87) PCT Pub. No.: WO2020/074362
PCT Pub. Date: Apr. 16, 2020

(65) Prior Publication Data
US 2021/0379872 A1  Dec. 9, 2021

(30) Foreign Application Priority Data
Oct. 10, 2018 (EP) .................................. 18199513

(51) Int. Cl.
*B32B 17/10* (2006.01)
*H05B 3/28* (2006.01)
*H05B 3/86* (2006.01)

(52) U.S. Cl.
CPC .. *B32B 17/10385* (2013.01); *B32B 17/10036* (2013.01); *B32B 17/10192* (2013.01);
(Continued)

(58) Field of Classification Search
CPC ............... H05B 3/84; H05B 2203/013; H05B 2203/008; H05B 2203/016;
(Continued)

(56) References Cited

U.S. PATENT DOCUMENTS 9,301,343 B2 * 3/2016 Ishizeki ............ B32B 17/10385
2003/0019859 A1   1/2003 Sol
(Continued)

FOREIGN PATENT DOCUMENTS

EP    3365174 B1 * 10/2023 ............. B32B 17/10
GB    1 432 034       4/1976
(Continued)

OTHER PUBLICATIONS

International Search Report issued on Dec. 3, 2019 in PCT/EP2019/076822 filed on Oct. 3, 2019.

*Primary Examiner* — Chris Q Liu
(74) *Attorney, Agent, or Firm* — Oblon, McClelland, Maier & Neustadt, L.L.P.

(57) ABSTRACT

A laminated electrically heatable glazing panel includes: (i) a first outer and second inner substrates with respectively an internal and an external faces, laminated to one another via at least one polymer inclusive interlayer, (ii) a coating including at least one heatable conductive layer provided between the outer and the inner substrates, the coating divided into at least one heatable coating zone and at least one non-heatable coating zone, the first heatable zone being delimited by at least two zone boundaries which are insulating by a coating deletion area, and (iii) at least a first and second conductive bus bars, each of the spaced first and second bus bars adapted to supply electrical voltage across the at least one electrically heatable coating zone. Only the at least one electrically heatable coating zone is heated when
(Continued)

current runs through said first and second bus bars and wherein the conductive path is defined between the busbars.

14 Claims, 2 Drawing Sheets

(52) U.S. Cl.
CPC .... *B32B 17/10247* (2013.01); *B32B 17/1044* (2013.01); *H05B 3/283* (2013.01); *H05B 3/86* (2013.01); *B32B 2255/205* (2013.01); *B32B 2307/202* (2013.01); *B32B 2307/412* (2013.01); *B32B 2315/08* (2013.01); *B32B 2457/00* (2013.01); *B32B 2605/006* (2013.01); *B32B 2605/08* (2013.01); *H05B 2203/011* (2013.01); *H05B 2203/013* (2013.01)

(58) Field of Classification Search
CPC ............... H05B 2203/017; H05B 3/86; H05B 2203/011; H05B 2203/031; H05B 3/12; B32B 17/10036; B32B 17/10761; B32B 17/10174; B32B 17/10229; B32B 17/10192; B32B 17/1077; B32B 17/10788; B32B 17/10183; B32B 17/10293; B32B 2307/202; B32B 2307/412; B32B 2605/006; B32B 27/08; B32B 27/30; B32B 27/36
USPC ........................................ 219/203, 522, 543
See application file for complete search history.

(56) References Cited

U.S. PATENT DOCUMENTS

| | | |
|---|---|---|
| 2003/0116551 A1 | 6/2003 | Sol et al. |
| 2017/0265253 A1 | 9/2017 | Schall et al. |
| 2020/0170079 A1* | 5/2020 | Baruzier ............. H05B 3/0014 |

FOREIGN PATENT DOCUMENTS

| | | | | |
|---|---|---|---|---|
| GB | 1432034 A | * | 4/1976 | ............. B32B 17/10 |
| RU | 2768795 C2 | * | 3/2022 | ....... B32B 17/10036 |
| WO | WO 02/078399 A1 | | 10/2002 | |
| WO | WO 03/024155 A2 | | 3/2003 | |
| WO | WO 2016/020113 A1 | | 2/2016 | |

* cited by examiner

HEATABLE GLAZING PANEL

FIELD OF THE INVENTION

The present invention relates to an electrically heatable glazing panel.

TECHNICAL BACKGROUND

In the case of heatable glazing panels comprising an electrically conductive coating layer and being of substantially regular shape, for example rectangular shape, electrical current is brought to a conductive coating layer through, for example, metallic bus bars, which are substantially parallel one to another. In this particular case the distance between the bus bars along their whole length remains substantially the same. The electrical resistance of the current path along the length of the bus bars is therefore substantially the same. When submitting such glazing panels to a given voltage, the amount of heat generated will be substantially uniform throughout the whole surface of the glazing panel covered with the conductive coating layer.

In the case of heatable glazing panels of substantially irregular shape, for example glazing panels with application in the automotive, railway or aeronautical field, spaced bus bars which diverge at at least one portion along their length may be used. The distance between the bus bars therefore varies and consequently the electrical resistance of the current path also varies. Therefore, when submitting such glazing panels to a given voltage, the amount of heat generated will vary along the length of the bus bars, thereby creating the risk of local areas of overheating which may damage or destroy the conductive coating layer. Furthermore, when such heatable glazing panels are used for de-misting or de-icing purposes, certain areas may demist or deice more rapidly than others. This may create problems of visibility for an observer looking through such a glazing panel.

Heatable windows are known in the art. Conventional heatable windows for vehicles typically include first and second conductive bus bars in electrical contact with a conductive coating including an electroconductive layer. The first bus bar is usually provided at a top portion of the window, and the second bus bar at a bottom portion of the window. The electroconductive layer, at a location between the bus bars, generates heat when electric current is passed therethrough via the bus bars. In such a manner, snow and ice may be melted from vehicle windows such as windshields, backlites, sidelites, and/or the like. Windows may also be defogged in such a manner.

In recent years, laminated backlite and very large windshield extending to the sun roof to form a "one single piece-type" become desirable in vehicles such as cars, trucks, sport utility vehicles, and the like.

Unfortunately, with the conventional position of the busbar and the zone to defrost/defog, it is generally difficult to heat uniformly and efficiently the glazing and particularly in the main zone of the glazing corresponding to the zone of visibility for an observer looking through such a glazing panel. If one were to simply modify the shape of the upper bus bar in a conventional heatable windshield to heat the glazing panel more efficiently, then hot spots would tend to develop at corners/curved areas of the upper bus bar as the windshield is heated (i.e., the current flow is not approximately uniformly distributed).

In view of the above, it will become apparent to those skilled in the art that there exists a need in the art for a heatable window design which enables current flow to be approximately uniformly distributed, so as to reduce the likelihood of overheating and enable efficient heating of the window.

SUMMARY OF THE INVENTION

According to one aspect, present invention provides a heatable glazing panel according to claim 1. Other claims define alternative and/or preferred aspects of the invention.

An object of this invention is to provide a heatable vehicle window including at A laminated electrically heatable glazing panel comprising:
  a first outer and second inner substrates with respectively an internal and an external faces, laminated to one another via at least one polymer inclusive interlayer;
  a coating including at least one heatable conductive layer provided between the outer and the inner substrates, said coating divided into at least one heatable coating zone and at least one non-heatable coating zone, the first heatable zone being delimited by at least two zone boundaries which are insulating by a coating deletion area,
  at least a first and second conductive bus bars, each of said first and second bus bars spaced bus bars adapted to supply electrical voltage across the at least one electrically heatable coating zone.

According to the present invention, only the at least one electrically heatable coating zone is heated when current runs through said first and second bus bars and wherein the conductive path is defined between the busbars.

Another object of this invention is to provide a heatable window design without being susceptible to a high likelihood of overheating and the uniform heating in the at least first heatable zone.

Another object of this invention is to fulfill one or more of the above-listed objects.

The heat generated when applying a voltage across the spaced bus bars may be substantially the same over the whole surface of the glazing panel. In one embodiment, the glazing panel may thus be de-iced or de-misted substantially uniformly.

Advantageously, at least one portion of the conductive path extends substantially from a lower edge of the glazing panel to an upper edge of the glazing panel. In this embodiment heat may be generated at substantially the same time at the upper edge and at the lower edge of the glazing panel affording uniform heating at both these edges of the glazing panel.

According to an embodiment of the present invention, at least one portion of the conductive path extends substantially from a lateral edge of the glazing panel to the opposite lateral edge of the glazing panel and the lower edge of the glazing panel. This particularly the case for a large windshield for automotive as for example a windshield extending to a glass sunroof to form a one piece type glazing formed by the windshield and the glass sunroof, also called canopy. This type of glazing presents visual advantages and are difficult to heat uniformly without creating hot spot and consequently damages in the glazing may be formed.

Thus, one object of the present invention is to propose a solution to heat uniformly, quickly and efficiently the zone of visibility for an observer looking through such a glazing panel. This is possible thanks to the delimitation of the zone to be heated quickly and efficiently by decoating areas.

Preferably, the glazing panel is substantially covered with the electrically conductive coating layer; for example, at least 60%, 70%, 75%, 80% 85%, 90% or 95% of the glazing panel may be covered with the coating layer. This may provide a glazing panel with optical properties (for example reflection, colour in reflection, total visible light transmission, total energy transmission) which are substantially the same in each zone and preferably substantially the same over the entire visible surface of the glazing.

Preferably, the glazing panel according to the present invention, is an automotive glazing and more particularly a windshield or a laminated backlite.

Arranging for the conductive path of an electrically heatable zone according to the present invention to heat uniformly and efficiently at least the desired zone within the electrically conductive coating layer may enable the surface of the conductive path to be designed independently of the size, shape or configuration of the glazing panel. This may allow the electrical resistance of the conductive path to be selected at different portions of the glazing panel without direct limitation to the height, shape or configuration of the glazing panel at the portion in question. In some embodiments, this may be used to achieve substantially even heating over the entire surface of the glazing panel, particularly where substantially the same voltage is applied across each electrically conductive heatable zone.

Advantageously, the bus bars are located along the length of a same edge of the glazing panel, for example, along a lower edge of the glazing panel; this may facilitate masking of the bus bars from view, for example, by covering the bus bars with an enamel or other masking agent or by arranging for the bus bars to be hidden in use, for example by part of the bodywork of a vehicle.

The electrically heatable zone is delimited by at least two zone boundaries which are insulating. The expression "insulating" as used herein refers to a zone boundary which is less electrically conductive than the coating layer or which is substantially non conductive of electrical current.

A zone boundary may be provided by applying pattern wise over the conductive coating layer a material which is less conductive than the coating layer. Preferably, zone boundaries are provided by one or more non-coated portion of the glazing panel. The one or more non-coated portion may have an electrical resistance such that substantially no electrical current flows through it when a voltage is applied between the bus bars and thus may be substantially not conductive. The one or more non-coated portion may be provided by applying pattern wise to the substrate a masking agent before depositing the electrically conductive layer and removing subsequently the masking agent covered with the coating layer. Alternatively, the one or more non-coated portion may be provided by removal of the conductive coating layer after deposition. Advantageously, the coating layer may be removed with a laser, for example a laser DIODE. The zone boundaries may be substantially invisible to the naked eye, particularly if formed by laser removal of part of the coating layer. Advantageously, the width of the zone boundary is equal or higher than 300 μm. A zone boundary may delimit or substantially delimit one electrically heatable zone from another electrically heatable zone.

The bus bars may be formed by deposition of a noble metal paste, for example a silver paste, or by deposition of a metallic ribbon.

Arranging the electrically conductive coating layer to be a solar control coating layer may enable the functions of preventing excessive passage of solar energy through the glazing to be combined with the heatability of the glazing panel. The term "solar control" refers herein to a coating layer which increases the selectivity of a substrate, that is, increases the ratio of incident visible light transmitted through a substrate to the incident solar energy transmitted through the substrate. Alternatively, the conductive coating layer may be a low emissivity coating.

The conductive coating layer may be deposited by a vacuum deposition technique, for example by magnetron sputtering, or be pyrolytically formed, for example by chemical vapour deposition. The coating layer is preferably applied over the entire surface or over the majority of the surface of the substrate.

In a preferred embodiment of the present invention, the coating film comprises at least one metallic infra-red reflective layer. The coating film may comprise a sequence of layers as follows: dielectric layer/silver/dielectric layer or dielectric layer/silver/dielectric layer/silver/dielectric layer. The dielectric layers may comprise, for example, tin oxide, zinc oxide, silicon nitride, titanium oxide, aluminium oxide or mixtures of one or more thereof.

The electrically conductive coating layer preferably has a resistance comprised between 0.5 and 100 ohms per square, preferably between 0.5 and 25 ohms per square, for example, 0.8, 2, 5 or 10 ohms per square.

In the glazing panel according to the present invention, the substrate may be glass, for example a sheet of flat glass, soda lime glass or float glass, particularly a sheet of glass intended for subsequent use as or incorporated in an architectural or vehicle glazing panel. It may undergo a thermal toughening treatment or a bending treatment before or after the coating layer has been deposited onto at least part of its surface. Alternatively, the substrate may be a rigid or flexible plastics sheet material which may equally be intended for subsequent use as or incorporated in an architectural or vehicle glazing panel.

The electrically conductive coating layer may be provided directly at a surface of the substrate, alternatively, it may be carried by a film, for example, a PET or other plastics sheet material incorporated in a glazing panel.

The glazing panel may be a windshield or a backlite of a vehicle or a train, a windshield of an aircraft or a glazing panel with applications in the nautical field.

The glazing panel may be adapted to have a voltage of between 10 and 100 volts applied across the bus bars, preferably between 30 and 55 volts. For automobile applications, a voltage of 32 volts, more preferably 36 volts, most preferably 42 volts, is applied. Alternatively, the glazing panel may be adapted to have a voltage of between 10 and 14 volts applied across the bus bars, for example about 12 volts. The heat generated by the zone heatable electrically is preferably comprised between 250 and 1500 watts per square meter.

DETAILED DESCRIPTION

The invention will now be described, by way of example only, with reference to FIGS. 1-2 which are schematic representations of a glazing panel.

Certain embodiments of this invention relate to a heatable vehicle window and more particularly a backlite including at least a first heating zone. A heatable coating (including one or more layers, at least one of which is conductive and heatable) is originally provided on a substrate of the window. The original coating is partially deleted so as to divide the original coating into at least two different spaced apart heatable coating portions and heating zone. First and second spaced apart conductive bus bars are provided over the heatable coating portions, with both bus bars being in electrical communication with each of the at least two different heatable coating portions. Using the two bus bars, current is caused to run through the at least one heating zone spaced apart heatable coating portions (but not connected to the busbars) in order to heat uniformly and efficiently the main zone corresponding to zone of visibility for an observer looking through such a glazing panel, thereby enabling the window to be heated.

Because of the division of the coating into at least two different coating portions, approximately uniform current distribution is enabled along the top bus bar so as to reduce the likelihood of overheating when the window is being heated.

Figure 1:
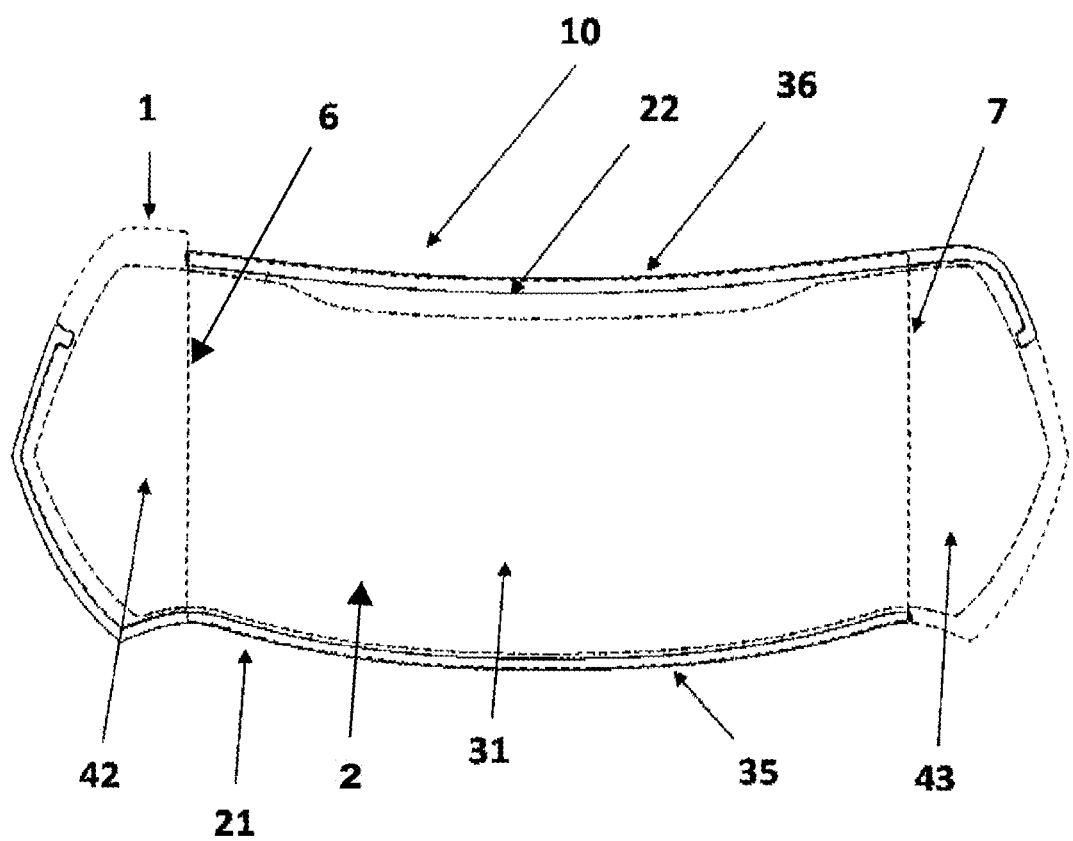
FIG. 1 is a top plan view of a heatable vehicle backlite according to another exemplary embodiment of this invention.
Figure 2:
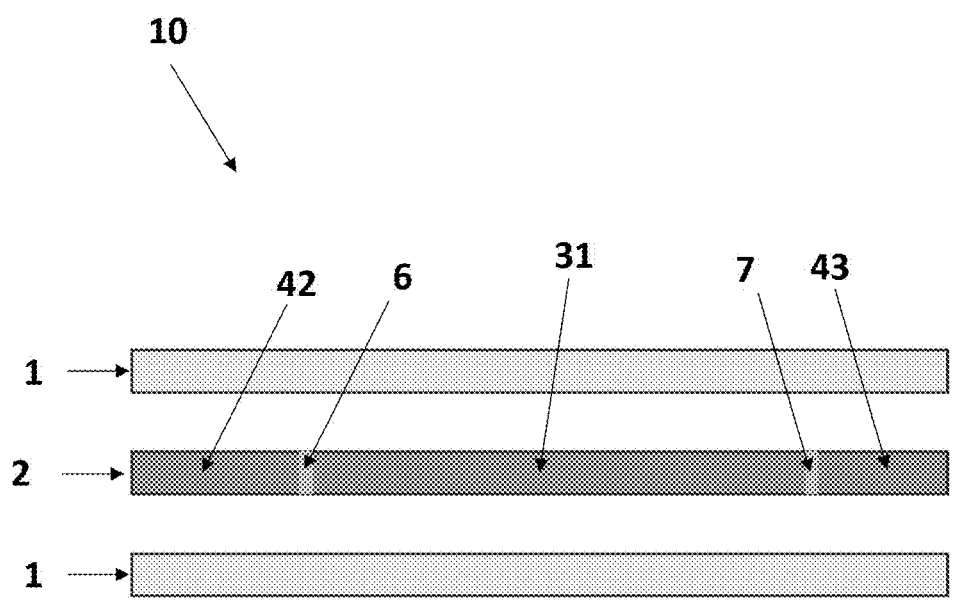
FIG. 2 is a cross-sectional view of the heatable vehicle backlite.

Referring to FIGS. 1-2, the vehicle backlite includes coating sandwiched between first and second glass substrates, respectively. Coating may be a single layer coating (e.g., of conductive Ag or ITO) in certain embodiments of this invention, or alternatively may be a multi-layer low-E coating in other embodiments of this invention Coating is at least partially deleted via deletion lines in order to divide the coating into at least two different spaced apart heatable coating portions, i.e., first heatable coating portion, second or/third intermediate coating portion not dedicated to be heated. Such deletion of the original coating may be done via laser deletion, sand-blasting deletion, a deleting abrasive wheel or disc, or any other suitable coating deletion technique/device.

Heatable coating portions are spaced apart from one another portions but not heated by insulating areas formed by the coating deletion (i.e., see deletion/insulating area between heatable coating portions and deletion/insulating area).

Because the coating is deleted via deletion lines, the first heatable zone is electrically insulated from one another coated portions (completely or at least partially). For purposes of example only, insulating/deletion areas can be formed in the shape of a fine line (e.g., providing a gap of about 0.5 mm or less). Optionally, in certain embodiments, the coating may also deleted along at least one edge of the window (e.g., see coating deletion area 4c along edge(s) of the window) so as to accommodate a bus bar lead, extension (s), or the like.

Still referring to FIGS. 1-2, polyvinyl butyral (PVB) inclusive interlayer (not shown) is provided between the substrates (1), for conventional lamination purposes. According to certain embodiments of this invention, coating is provided on the interior surface of one of substrates (1) so that the coating is provided on what is known conventionally as the backlite or windshield's second or third surface. FIGS. 1-2 show a glazing panel (10) in the form of a automotive backlite laminated glazing, a substantially transparent, electrically conductive coating layer (2) over substantially the entire surface of the glazing, bus bars (21, 22), and insulating zone boundaries (6), (7), which delimit one electrically heatable zones (31). The electrically heatable zone (31) is the zone of visibility for an observer looking through such a glazing panel. The two zone (42, 43) adjacent to the first heatable zone provided with an electrically coating are not heated since they are not electrically connected to the busbars (21, 22). Each bus bar is formed by example screen-printing a layer of silver paste of 40 µm thickness and 15 mm width.

Busbars are placed in the laminated glazing in contact with the heatable conductive coating.

In this embodiment, spaced bus bars 21, 22, disposed in the upper 35 and lower edge 36 of the glazing. In this embodiment, the busbars 21, 22 extended partially over the lateral edges of the glazing. The insulating zone boundaries, 7 which have preferably the form of lines delimit the zone 31 to be heated.

The busbar may be made in copper, then the busbar is stuck to the glazing thanks to an adhesive.

A conductive path of the first electrically heatable zone 31 is defined between the bus bars 21, 22 which are adapted to apply an electrical voltage across this electrically heatable zone.

The insulating zone boundaries 6, 7 are made by deletion of the coating. The deletion of the coating are made substantially perpendicularly to the upper and lower edges of the glazing 35, 36.

Advantageously, the coating layer may be removed with a laser, for example a laser DIODE. The zone boundaries may be substantially invisible to the naked eye, particularly if formed by laser removal of part of the coating layer. Advantageously, the width of the zone boundary is equal or higher than 300 µm. A zone boundary may delimit or substantially delimit one electrically heatable zone from another electrically heatable zone.

The bus bars may be hidden in use by concealment of the lower and lateral edges of the glazing panel in a vehicle body in which the glazing panel is adapted to be mounted.

According to another embodiment of the present invention, the glazing panel 10 may be an automotive canopy ie a windshield extending to the sun roof comprising a laminated glazing, a substantially transparent, electrically conductive coating layer over substantially the entire surface of the glazing, bus bars, and insulating zone boundaries, which delimit one electrically heatable zones. The electrically heatable zone is the zone of visibility for an observer looking through such a glazing panel. The two zone adjacent to the first heatable zone provided with an electrically coating are not heated since they are not electrically connected to the busbars. Each bus bar is formed by example screen-printing a layer of silver paste of 40 □m thickness and 15 mm width.

Busbars are placed in the laminated glazing in contact with the heatable conductive coating.

In this embodiment, spaced bus bars, are spaced laterally in the vicinity of the lateral edges of the glazing and in the lower edge of the glazing in contact with the heatable conductive coating. The busbar in this particular embodiment is made in one piece. The busbar may be made in copper, then the busbar is stuck to the glazing thanks to an adhesive. In this particular embodiment, the first boundary is provided in the lower part of the glazing and the second boundary is provided in the upper part of the glazing more particularly in "the windshields part" to delimit the to the zone of visibility for an observer looking through such a glazing panel. The canopy is in this case not heated by applying an electrical current. The busbar may be made in one piece.

The busbar may be made in copper, then the busbar is stuck to the glazing thanks to an adhesive.

The invention claimed is:

1. A laminated electrically heatable glazing panel comprising:

an outer substrate and an inner substrate with respectively an internal face and an external face, laminated to one another via a polymer inclusive interlayer;

a coating comprising a heatable conductive layer provided between the outer and the inner substrates, said coating divided into at least one electrically heatable coating zone and at least one non-heatable coating zone, the at least one electrically heatable zone being delimited by at least two zone boundaries which are insulating by a coating deletion area; and first and second conductive bus bars spaced apart from each other, each of said first and second bus bars adapted to supply electrical voltage across the at least one electrically heatable coating zone, wherein the glazing panel presents an irregular shape such that a distance between the first and second bus bars varies, wherein only the at least one electrically heatable coating zone is heated when current runs through said first and second bus bars, wherein a conductive path of the at least one electrically heatable coating zone is defined between the first and second bus bars, wherein the at least two zone boundaries have a width of 300 µm or more, wherein the heatable conductive layer of the coating is coated on one of the outer and inner substrates, and wherein the first and second bus bars are at least partially parallel to each other.

2. The electrically heatable glazing panel according to claim 1, wherein at least one portion of the conductive path extends from a lower edge of the glazing panel to an upper edge of the glazing panel.

3. The electrically heatable glazing panel according to claim 1, wherein the at least one electrically heatable zone is a main surface of the glazing panel.

4. The electrically heatable glazing panel according to claim 1, wherein the first bus bar is provided along a length of a lower edge of the glazing panel, and the second bus bar is provided along a length of an upper edge of the glazing panel.

5. The electrically heatable glazing panel according to claim 1, wherein the at least one electrically heatable coating zone is delimited by at least one zone boundary which is insulating by non-coated portions of the glazing panel.

6. The electrically heatable glazing panel according to claim 1, wherein one of the first and second bus bars extends along the at least one electrically heatable coating zone.

7. The electrically heatable glazing panel according to claim 1, wherein the coating is a solar control coating layer.

8. The electrically heatable glazing panel according to claim 1, wherein the coating has a resistance comprised between 2 and 25 ohms/square.

9. The electrically heatable glazing panel according to claim 1, wherein at least one of the outer and inner substrates is a glass sheet.

10. The electrically heatable glazing panel according to claim 1, wherein first and second linear-shaped coating deletion areas delimit the at least one electrically heatable coating zone.

11. The electrically heatable glazing panel according to claim 1, wherein the glazing panel is automotive windshield.

12. The electrically heatable glazing panel according to claim 1, wherein the glazing panel is an automotive glazing formed in a piece of a windshield extended to a sunroof.

13. The electrically heatable glazing panel according to claim 1, wherein the glazing panel is a backlite wherein decoating areas are perpendicular in planar view to upper and lower edges of the glazing panel.

14. The electrically heatable glazing panel according to claim 1, wherein the at least one electrically heatable coating zone extends over a field of view of a passenger of an automobile.

* * * * *